United States Patent [19]

Nozawa et al.

[11] Patent Number: 4,661,581

[45] Date of Patent: Apr. 28, 1987

[54] PROCESS FOR PRODUCING AROMATIC POLYETHER KETONES AND POLYTHIOETHER KETONES

[75] Inventors: Seiichi Nozawa, Yamato; Michio Nakata, Yokohama, both of Japan

[73] Assignee: Mitsubishi Chemical Industries, Ltd., Tokyo, Japan

[21] Appl. No.: 656,325

[22] Filed: Oct. 1, 1984

[30] Foreign Application Priority Data

Sep. 29, 1983 [JP] Japan .............................. 58-181647
Nov. 8, 1983 [JP] Japan .............................. 58-209727
Nov. 10, 1983 [JP] Japan .............................. 58-211529

[51] Int. Cl.$^4$ .............................................. C08G 63/62
[52] U.S. Cl. .................................... 528/176; 528/196
[58] Field of Search ................................ 528/176, 196

[56] References Cited

U.S. PATENT DOCUMENTS 3,065,205 11/1962 Bonner, Jr. ......................... 528/196

FOREIGN PATENT DOCUMENTS 971227 5/1963 United Kingdom ................ 528/176
1164817 8/1966 United Kingdom .

Primary Examiner—Lucille M. Phynes
Attorney, Agent, or Firm—Oblon, Fisher, Spivak, McClelland & Maier

[57] ABSTRACT

A process for producing aromatic polyether ketones and polythioether ketones, which comprises reacting aromatic ethers or thioethers represented by the general formula:

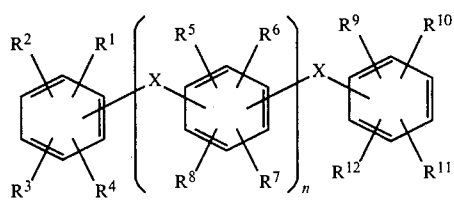

where each of $R^1$ to $R^{12}$ is a hydrogen atom, a halogen atom, a hydrocarbon group or an alkoxy group, n is an integer of 0 to 5, and X is an oxygen atom or a sulfur atom, with phosgene in aprotic solvent having a dielectric constant of lower than 20 and a dipole moment of lower than 3.0 in the presence of anhydrous halides of metals of Group III in the periodic table as a catalyst.

11 Claims, No Drawings

PROCESS FOR PRODUCING AROMATIC POLYETHER KETONES AND POLYTHIOETHER KETONES

BACKGROUND OF THE INVENTION

1. Field of the Invention

The present invention relates to a process for producing aromatic polyether ketones and polythioether ketones. Aromatic polyether ketones have been known to be physically superior polymers having excellent heat resistance, mechanical and electrical properties and dimensional stability, and low water absorption. The aromatic polythioether ketone is a novel polymer.

2. Discussion of the Background

As a process for the production a polyether ketone, it is known to react 4-phenoxybenzoyl chloride with boron trifluoride in hydrogen fluoride (U.S. Pat. No. 3,441,538). According to this process, it is required to initiate the reaction at a very low temperature (e.g. −78° C.) and yet it is necessary to conduct the reaction by means of a special reactor, and a very cumbersome operation is required for the recovery of the solvent. As another process, there has been known a process wherein 4,4'-difluorobenzophenone and an alkali metal salt of an aromatic dihydroxy compound are reacted in diphenyl sulfone. However, this process, also, has a drawback that it is necessary to conduct the reaction at a high temperature of at least 300° C. Further, U.S. Pat. No. 3,065,205 discloses a process for polymerizing diphenyl ether with isophthaloyl chloride in the presence of Friedel-Crafts catalyst (AlCl₃) and an aprotic solvent. However, there is no description that it is possible to obtain polyether ketones having a high polymerization degree as described in the present invention. Each process has an additional drawback that the starting material, i.e. 4-phenoxybenzoyl chloride or 4,4'-difluorobenzophenone, is expensive.

SUMMARY OF THE INVENTION

Under these circumstances, the present inventors have conducted extensive research to overcome the conventional difficulties, and have found it possible to readily obtain aromatic polyether ketones and polythioether ketones by reacting aromatic ethers or thioethers with phosgene in an aprotic solvent having a dielectric constant and dipole moment within specific ranges in the presence of halides of metals of Group III in the periodic table. Particularly, in the case of an aromatic polyether ketone, it is possible to obtain a polymer having a high polymerization degree. And the process is notably remarkable as a new method of synthesis which is capable of providing polyether ketones and polythioether ketones at an extremely low cost.

DETAILED DESCRIPTION OF THE PREFERRED EMBODIMENTS

Namely, the present invention provides a process for producing aromatic polyether ketones and polythioether ketones, which comprises reacting aromatic ethers or thioethers represented by the general formula:

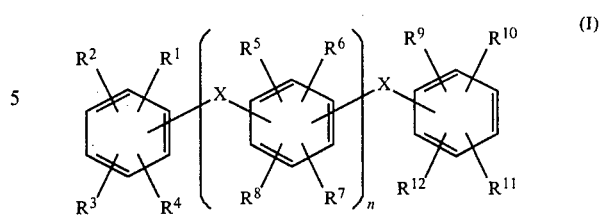

where each of $R^1$ to $R^{12}$ is a hydrogen atom, a halogen atom, a hydrocarbon group or an alkoxy group, n is an integer of 0 to 5, and X is an oxygen atom or a sulfur atom, with phosgene in aprotic solvent having a dielectric constant of lower than 20 and a dipole moment of lower than 3.0 in the presence of anhydrous halides of metals of Group III in the periodic table as a catalyst.

These polyether ketones and polythioether ketones have the following general formula:

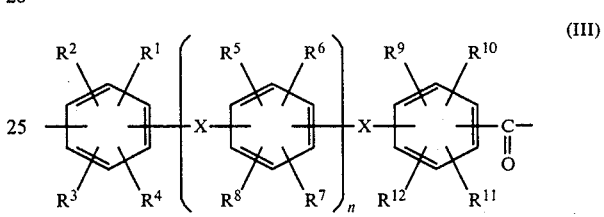

with $R^1$ to $R^{12}$, X and n as defined above.

Now, the present invention will be described in detail with reference to the preferred embodiments.

The aromatic ethers represented by the above-mentioned general formula I which may be employed in the present invention, include diphenyl ether, bis(3-chlorophenyl)ether, bis(3-methylphenyl)ether, bis(3,5-dimethylphenyl)ether, bis(3-methoxyphenyl)ether, bis(3,5-dichlorophenyl)ether, bis(3-bromophenyl)ether, bis(3-fluorophenyl)ether, bis(3,5-difluorophenyl)ether, bis(3-ethylphenyl)ether, 1,4-diphenoxybenzene, bis(4-phenoxyphenyl)ether, 1,3-diphenoxybenzene, bis(3-phenoxyphenyl)ether, 4,4'-bis(4-phenoxyphenyl)diphenyl ether, (4-phenoxyphenyl)-4'-phenoxy diphenyl ether, 1,4-bis(3methylphenoxy)benzene, 1,4-bis(3-chlorophenoxy)benzene, 1,4-bis(3-methoxyphenoxy)benzene, 1,4-bis(3,5-dimethylphenoxy)benzene, 1,4-bis(3-bromophenoxy)benzene and 1,4-bis(3,5-difluorophenoxy)benzene. However, useful aromatic ethers are not restricted to these specific examples, and any compound represented by the general formula I may be used. These aromatic ethers may be used alone or in combination as a mixture. Those having a 1,4- or 1,3-structure are preferred. From the viewpoint of cost, it is most preferred to employ diphenyl ether or 1,4-diphenoxy benzene among them.

The aromatic thioethers represented by the above-mentioned general formula I which may be used in the present invention, include diphenyl sulfide, bis(3-chlorophenyl)sulfide, bis(3-methylphenyl)sulfide, bis(3,5-dimethylphenyl)sulfide, bis(3-methoxyphenyl)sulfide, bis(3,5-dichlorophenyl)sulfide, bis(3-bromophenyl)sulfide, bis(3-fluorophenyl)sulfide, bis(3,5-difluorophenyl)sulfide, bis(3-ethylphenyl)sulfide, 1,4-bis(phenylmercapto)benzene, bis(4-phenylmercaptophenyl)sulfide, 1,3-bis(phenylmercapto)benzene, 4,4'-bis(4-phenylmercaptophenyl)diphenyl sulfide, (4-phenylmercaptophenyl)-4'-phenylmercaptodiphenyl sulfide, 1,4-bis(3-methylphenylmercapto)benzene, 1,4- bis(3-chlorophenylmercapto)benzene, 1,4-bis(3-methoxyphenylmercapto)benzene, 1,3-bis(3,5-dimethylphenylmercapto)benzene, 1,3-bis(3-bromophenylmercapto)benzene and 1,4-bis(3,5-difluorophenylmercapto)benzene. However, useful aromatic thioethers are not restricted to these specific examples, and any thioether represented by the general formula I may be used. These aromatic thioethers may be used alone or in combination as a mixture. Those having a 1,4- or 1,3-structure, are preferred. From the viewpoint of cost, it is most preferred to employ diphenyl sufide or 1,4-diphenylmercaptobenzene among them.

The solvent which may be used in the present invention, has a dielectric constant of lower than 20, preferably lower than 10, and a dipole moment of lower than 3.0, preferably lower than 2.0, and is selected from solvents capable of being used for Friedel-Crafts reactions. Specifically, there may be mentioned carbon disulfide, methylene chloride, dichloroethane, o-dichlorobenzene, chlorobenzene and hexane. Among them, carbon disulfide is preferably used. The solvent is used usually in an amount of from 0.1 to 500 parts by weight, preferably from 2.5 to 100 parts by weight, relative to 1 part by weight of the ethers or thioethers of the formula I used as the starting material.

The phosgene is used usually in an amount of from 1 to 500 mols relative to 1 mol of the ethers or thioethers of the formula I.

The anhydrous halide of a metal of Group III in the periodic table which may be employed in the present invention, includes aluminum trichloride, aluminum tribromide, aluminum trifluoride, aluminum triiodide, ethyl aluminum dichloride, diethyl aluminum chloride, ethyl aluminum sesquidichloride, boron trifluoride, boron trichloride, gallium trichloride and indium trichloride. However, the useful metal halide is not restricted to these specific examples. Among them, aluminum trichloride, aluminum tribromide and aluminum trifluoride are preferred.

The amount of the metal halide is not critical. However, the metal halide is employed usually in an amount of from 0.01 to 100 mols, preferably from 0.1 to 10 mols, relative to 1 mol of the ethers or thioethers of the formula I.

The process of the present invention may be carried out by adding the Group III metal halide to a solution containing the ethers or thioethers of the formula I and phosgene, or by adding phosgene and the ethers or thioethers of the formula I to the solvent in the presence of the metal halide, or by introducing phosgene into the solvent containing the ethers or thioethers of the formula I and the metal halide.

In the present invention, the reaction temperature is not critical, but is usually within a range of from $-10°$ to 300° C., preferably from 0° to 100° C.

According to the present invention, it is possible to readily obtain a polyether ketone having $\eta_{inh}$ of at least 0.3 dl/g, especially from 0.5 to 3 dl/g, as measured at 30° C. in 97% sulfuric acid at a concentration of 1.0 g/dl, or a polythioether ketone having $\eta_{inh}$ of at least 0.05 dl/g, especially from 0.1 to 2 dl/g, as measured in the same manner as above.

This polythioether ketone has the following general formula:

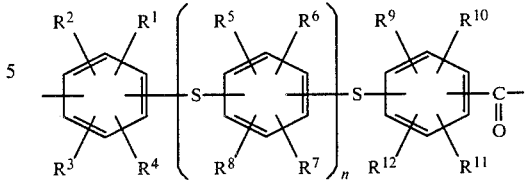

with $R^1$ to $R^{12}$ and n as defined above.

According to the present invention, under mild conditions and at an extremely low cost, it is possible to produce aromatic polyether ketones and polythioether ketones as a physically superior polymer having excellent heat resistance, mechanical and electrical properties and dimensional stability and low water absorption.

Now, the present invention will be described in further detail with reference to Examples. However, it should be understood that the present invention is by no means restricted to these specific Examples.

In the following Examples, the inherent viscosity ($\eta_{inh}$) was measured at 30° C. in 97% concentrated sulfuric acid at a concentration of 1.0 g/dl. The IR spectrum was measured by means of a KBr disc. The measurement of the DSC was carried out in $N_2$ at a temperature rising rate of 16° C./min. The $^1$H-NMR spectrum was measured by means of a 100 MHz spectrometer by using deuterated conc. sulfuric acid as the solvent. The chemical shift was determined by using a signal at 2.5 ppm of dimethyl sulfoxide as an internal standard.

EXAMPLE 1

Into 150 ml of a carbon disulfide solution containing 7.15 g of diphenyl ether, 22.25 g of phosgene was introduced under cooling with ice. While stirring this solution under cooling with ice, 14.53 g of aluminum trichloride was added thereto. After the completion of the addition of the aluminum trichloride, the reaction was continued for 4 hours under cooling with ice and for further 15 hours at room temperature, whereby polymer was obtained. This polymer was washed once with 300 ml of ethanol, twice with 300 ml of 2% hydrochloric acid aqueous solution and twice with deionized water, and vacuum-dried at 120° C. overnight.

Yield: 6.7 g; $\eta_{inh}$: 0.66 dl/g; IR: 1650 cm$^{-1}$ (aromatic ketone), 1235 cm$^{-1}$ (aromatic ether); DSC: melting point at 368° C.; $^1$H-NMR 6.88 ppm,

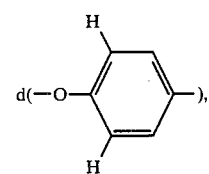

7.58 ppm,

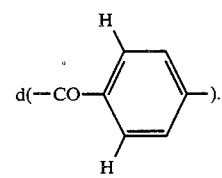

EXAMPLE 2

Into 150 ml of a carbon disulfide solution containing 7.15 g of diphenyl ether, 14.53 g of aluminum trichloride was added under cooling with ice. This solution was stirred for 1 hour at room temperature, and again cooled with ice and 22.25 g of phosgene was introduced. The mixture was stirred for 1 hour under cooling with ice, and then reacted at room temperature for 17 hours, whereby polymer was obtained. The polymer was treated in the same manner as in Example 1.

Yield: 5 9 g; $\eta_{inh}$: 0.73 dl/g; IR: 1650 cm$^{-1}$ (aromatic ketone), 1235 cm$^{-1}$ (aromatic ether); DSC: melting point at 366° C.; $^1$H-NMR: 6.90 ppm,

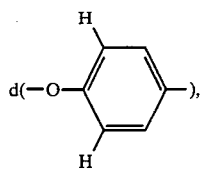

7.60 ppm,

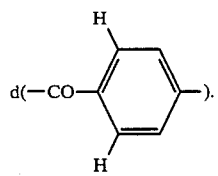

EXAMPLE 3

To 150 ml of a carbon disulfide solution containing 21.8 g of phosgene and 11 g of 1,4-diphenoxybenzene, 76.3 g of aluminum trichloride was added under cooling with ice to maintain the reaction temperature at a level of at most 5° C. After the completion of the addition of aluminum trichloride, the reaction was continued for 4 hours under stirring and cooling with ice and further for 15 hours at room temperature. After the completion of the reaction, the reaction mixture was poured into 500 ml of methanol, whereby a white powdery polymer was obtained. The polymer was separated by filtration, then washed once with 500 ml of methanol, twice with 500 ml of a 2% hydrochloric acid aqueous solution and twice with deionized water, and vacuum-dried at 120° C. overnight. In the infrared absorption spectrum of the polymer thus obtained, the absorption by the aromatic ether was observed at 1225 cm$^{-1}$, and the absorption by the aromatic ketone was observed at 1650 cm$^{-1}$. The viscosity of the polymer was $\eta_{inh}=0.67$ dl/g.

Elemental analysis: Measured values: C, 79.16%; H, 4.20%. Calculated values (as $C_{19}H_{12}O_2$): C, 48.98%; H, 4.16%.

The melting point (DSC) was 328° C. $^1$H-NMR, 7.39 ppm, 6.61 ppm.

EXAMPLE 4

To 150 ml of a carbon disulfide solution containing 2.3 g of phosgene and 7.82 g of diphenyl sulfide, 14.6 g of aluminum trichloride was added under cooling with ice to maintain the temperature of the reaction mixture at a level of at most 5° C. After the completion of the addition of aluminum trichloride, the reaction was continued for 4 hours under stirring and cooling with ice and for further 18 hours at a room temperature. After the completion of the reaction, the reaction mixture was poured into 500 ml of methanol, whereby a slightly yellowish green powdery polymer was obtained. The polymer was separated by filtration, then washed once with 500 ml of methanol, twice with 500 ml of a 2% hydrochloric acid aqueous solution and twice with 500 ml of desalted water, and vacuum-dried at 150° C. for one day and night. The yield was 30%.

In the infrared absorption spectrum of the polymer thus obtained, the absorption by the aromatic ketone was observed at 1655 cm$^{-1}$. The viscosity of the polymer was $\eta_{inh}=0.11$ dl/g.

Elemental analysis: Measured values: C, 72.09%; H, 3.69%. Calculated values (as $C_{13}H_8OS$): C, 73.56%; H, 3.80%.

The melting point (DSC) was 326° C.

EXAMPLE 5

To 250 ml of a dichloroethane solution containing 22.4 g (0.23 mole) of phosgene and 38.6 g (0.23 mole) of diphenyl ether, 76.3 g (0.57 mole) of aluminum trichloride was added under cooling with ice to maintain the reaction temperature at a level of below 5° C. After the completion of the addition of aluminum trichloride, the reaction was continued for 4 hours under stirring with cooling, and further for 16 hours at room temperature. After the completion of the reaction, the reaction mixture was poured into 750 ml of cold methanol, whereby a white powdery polymer was obtained. The polymer was separated by filtration, then washed once with 500 ml of methanol, twice with 500 ml of a 2% hydrochloric acid aqueous solution and twice with 500 ml of deionized water, and vacuum-dried at 150° C. overnight. The yield was 52%. In the infrared absorption spectrum of the polymer, the absorption by the aromatic ether was observed at 1240 cm$^{-1}$, and by the aromatic ketone at 1650 cm$^{-1}$.

The $^1$H-NMR spectrum showed two peaks at 6.9 ppm and 7.6 ppm (integrated intensity 1:1).

The viscosity of the polymer was $\eta_{inh}=0.31$ dl/g.

Elemental analysis: Measured values: C, 79.78%; H, 3.91%. Calculated values (as $C_{13}H_8O_2$): C, 79.5%; H, 4.01%.

EXAMPLE 6

A polymer was obtained in a yield of substantially 100% in the same manner as in Example 1 except that 0.084 mole of diphenyl ether, 0.84 mole of phosgene and 0.22 mole of aluminum trichloride were used and 150 ml of carbon disulfide was used as the solvent. The obtained polymer had a melting point at 365° C. (DSC) and a viscosity of $\eta_{inh}=0.59$ dl/g.

EXAMPLE 7

The reaciton was initiated in the same manner as in Example 5, and continued for 1 hour under cooling with ice and for further 1 hour at room temperature. Then, a reflux condenser cooled with ice water was attached to the reactor, and the reaction was continued for 9 hours while mildly refluxing at a bath temperature of 45° C., whereby polymer was obtained. The polymer was treated in the same manner as in Example 1.

Yield: 6.8 g; $\eta_{inh}$: 0.67 dl/g; IR: 1650 cm$^{-1}$ (aromatic ketone), 1240 cm$^{-1}$ (aromatic ether).

EXAMPLE 8

The polymerization was conducted in the same manner as in Example 1 except that instead of carbon disulfide, n-hexane was employed. The polymer thereby obtained was powdery.

Yield: 4.8 g; $\eta_{inh}$: 0.12 dl/g; IR: 1650 cm$^{-1}$ (aromatic ketone), 1235 cm$^{-1}$ (aromatic ether).

EXAMPLE 9

The polymerization was carried out in the same manner as in Example 1 except that instead of carbon disulfide, chlorobenzene was employed.

Yield: 8.1 g; $\eta_{inh}$: 0.05 dl/g; IR,: 1660 cm$^{-1}$ (aromatic ketone), 1250 cm$^{-1}$ (aromatic ether).

EXAMPLE 10

The polymerization was conducted in the same manner as in Example 1 except that instead of carbon disulfide, o-dichlorobenzene was employed.

Yield: 7.4 g; $\eta_{inh}$: 0.14 dl/g; IR: 1650 cm$^{-1}$ (aromatic ketone), 1240 cm$^1$ (aromatic ether).

EXAMPLE 11

The polymerization was conducted in the same manner as in Example 5 except that instead of the aluminum trichloride, 20.0 g of gallium chloride was employed.

Yield: 3.5 g; $\eta_{inh}$: 0.12 dl/g; IR: 1650 cm$^{-1}$ (aromatic ketone), 1240 cm$^{-1}$ (aromatic ether).

COMPARATIVE EXAMPLES 1 to 5

The polymerization was conducted in the same manner as in Example 5 except that instead of the aluminum trichloride, typical Friedel-Crafts acylation catalysts other than halide compounds of metals of Group III in the periodic table were employed. The results are summarized in Table 1.

TABLE 1

| Comparative Example No. | Catalyst (g) | Results |
| --- | --- | --- |
| 1 | FeCl$_3$ (17.7 g) | Yield: 0.2 g; IR: 1230 cm$^{-1}$ (aromatic ether). No peak due to aromatic ketone was observed; Conc. H$_2$SO$_4$ insoluble |
| 2 | SnCl$_4$ (28.4 g) | No polymerization |
| 3 | SbCl$_5$ (32.7 g) | No polymerization |
| 4 | TiCl$_4$ (20.7 g) | No polymerization |
| 5 | ZnCl$_2$ (14.9 g) | No polymerization |

We claim:

1. A process for producing an aromatic polyether ketone, said method comprising reacting, at a temperature of from $-10°$ to $300°$ C., an aromatic ether of the formula:

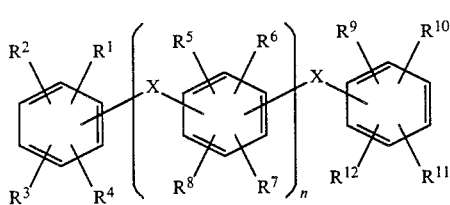

wherein each of R$^1$ to R$^{12}$ is independently a hydrogen atom, a halogen atom, a hydrocarbon group or an alkoxy group, n is an integer of 0 to 5, and X is an oxygen atom, with 1 to 500 moles of phosgene per mole of the said ether of formula I in 0.1 to 500 parts by weight of an aprotic solvent per 1 part by weight of said ether of formula I, said solvent having a dielectric constant of less than 20 and a dipole moment of less than 3.0, in the presence of 0.01 to 100 moles of a catalyst per mole of said ether of formula I, said catalyst being an anhydrous halide of a metal of Group III of the Periodic Table.

2. A process for producing an aromatic polyether ketone, said method comprising reacting, at a temperature from $-10°$ to $300°$ C., an aromatic ether of the formula:

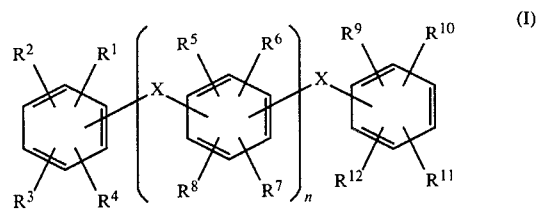

wherein each of R$^1$ to R$^{12}$ is independently a hydrogen atom, a halogen atom, a hydrocarbon group or an alkoxy group, n is an integer of 0 to 5, and X is an oxygen atom, with 1 to 500 moles of phosgene per mole of the said ether of formula I and 0.1 to 500 parts by weight of an aprotic solvent per 1 part by weight of said ether of formula I, said solvent having a dielectric constant of less than 20 and a dipole moment of less than 3.0, in the presence of 0.01 to 100 moles of a catalyst per mole of the said ether of formula I, said catalyst being an anhydrous halide of a metal of Group III of the Periodic Table, and obtaining an aromatic polyether ketone having an inherent viscosity, $\eta_{inh}$, of at least 0.3 dl g$^{-1}$ as measured at 30° C. in 97% sulfuric acid at a concentration of 1.0 g dl$^{-1}$.

3. A process for producing an aromatic polyether ketone, said method comprising reacting, at a temperature from $-10°$ to $300°$ C., an aromatic ether of the formula:

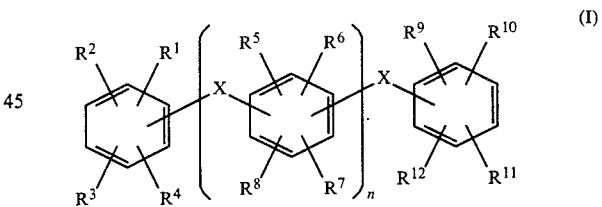

wherein each of R$^1$ to R$^{12}$ is independently a hydrogen atom, a halogen atom, a hydrocarbon group or an alkoxy group, n is an integer of 0 to 5, and X is an oxygen atom, with 1 to 500 moles of phosgene per mole of the said ether of formula I in 0.1 to 500 parts by weight of an aprotic solvent per 1 part by weight of the said ether of formula I, said solvent having a dielectric constant of less than 20 and a dipole moment of less than 3.0, in the presence of 0.01 to 100 moles of a catalyst per mole of the said ether of formula I, said catalyst being an anhydrous halide of a metal of Group III of the Periodic Table, and obtaining an aromatic polyether ketone having an inherent viscosity, $\eta_{inh}$, of at least 0.5 dl g$^{-1}$ as measured at 30° C. in 97% sulfuric acid at a concentration of 1.0 g dl$^{-1}$.

4. A process for producing an aromatic polyether ketone, comprising reacting an aromatic ehter of the formula:

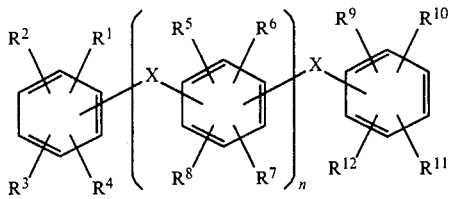

(I)

wherein each of $R^1$ to $R^{12}$ is a hydrogen atom, a halogen atom, a hydrocarbon group or an alkoxy group, n is an integer of 0 to 5, and X is an oxygen atom, with phosgene in an aprotic solvent having a dielectric constant lower than 20 and a dipole moment lower than 3.0, in the presence of an anhydrous halide of a metal of Group III of the Periodic Table.

5. The process of claim 4, wherein n is 0 to 1.

6. The process of claim 4, wherein the said anhydrous halide of a metal of Group III of the Periodic Table is an aluminum trihalide.

7. The process of claim 5, wherein the said solvent has a dielectric constant lower than 10 and a dipole moment lower than 2.0.

8. The process of claim 5, wherein the said solvent is carbon disulfide.

9. An aromatic polyether ketone of the following formula (III):

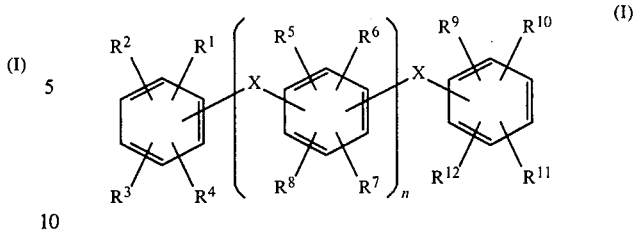

(I)

wherein each of $R^1$ to $R^{12}$ is a hydrogen atom, a halogen atom, a hydrocarbon group or an alkoxy group, n is an integer of 0 to 5, and X is an oxygen atom, said polyether ketone being obtained by reacting, at a temperature of from $-10°$ to $300°$ C., an aromatic ether of the formula:

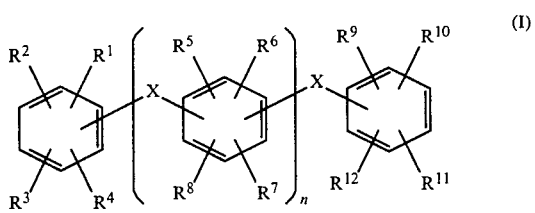

(I)

wherein each of $R^1$ to $R^{12}$ is independently a hydrogen atom, a halogen atom, a hydrocarbon group or an alkoxy group, n is an integer of 0 to 5, and X is an oxygen atom, with 1 to 500 moles of phosgene per mole of the said ether formula I in 0.1 to 500 parts by weight of an aprotic solvent per 1 part by weight of the said ether formula I, said solvent having a dielectric constant of less than 20 and a dipole moment of less than 3.0, in the presence of 0.01 to 100 moles of a catalyst per mole of the said ether formula I, said catalyst being an anhydrous halide of a metal of Group III of the Periodic Table.

10. The aromatic polyether ketone of claim 9, wherein the said aromatic polyether ketone has an inherent viscosity, $\eta_{inh}$, of at least 0.3 g$^{-1}$ as measured at 30° C. in 97% sulfuric acid at a concentration of 1.0 g dl$^{-1}$.

11. The polyether ketone of claim 9, wherein the said aromatic polyether ketone has an inherent viscosity, $\eta_{inh}$, of at least 0.5 dl g$^{-1}$ as measured at 30° C. in 97% sulfuric acid at a concentration of 1.0 g dl$^{-1}$.

* * * * *